United States Patent [19]

Latham

[11] Patent Number: 4,536,541

[45] Date of Patent: Aug. 20, 1985

[54] HIGH IMPACT RESISTANT POLYAMIDE

[75] Inventor: Roger A. Latham, Parkersburg, W. Va.

[73] Assignee: E. I. Du Pont de Nemours and Company, Wilmington, Del.

[21] Appl. No.: 584,277

[22] Filed: Feb. 27, 1984

[51] Int. Cl.³ .................. C08L 51/00; C08L 77/00
[52] U.S. Cl. .................................. 525/66; 525/183; 525/184
[58] Field of Search .................... 525/66, 183, 184

[56] References Cited

U.S. PATENT DOCUMENTS

| | | | |
|---|---|---|---|
| 4,078,014 | 3/1978 | Starkweather, Jr. et al. | 260/857 L |
| 4,174,358 | 11/1979 | Epstein | 525/183 |
| 4,246,371 | 1/1981 | Meyer et al. | 525/183 |
| 4,321,336 | 3/1982 | Meyer et al. | 525/183 |
| 4,346,194 | 8/1982 | Roura | 525/66 |
| 4,383,084 | 5/1983 | Paschke et al. | 525/184 |
| 4,410,661 | 10/1983 | Epstein et al. | 525/66 |

Primary Examiner—John G. Bleutge
Assistant Examiner—A. L. Carrillo

[57] ABSTRACT

High impact resistant polyamide resins containing an amorphous polyamide and dispersed particles of a toughener containing grafted succinic anhydride groups. The toughener has a particle size of less than about 360 nm, as determined by a small angle X-ray scattering technique. The toughener is present in the resin in the amount of at least 15% by weight.

8 Claims, No Drawings

HIGH IMPACT RESISTANT POLYAMIDE

FIELD OF THE INVENTION

This invention relates to polyamide resins that have high impact resistance at low temperatures. More particularly, this invention relates to amorphous polyamides that contain at least a particular amount of dispersed toughener particles of a particular group of chemical compositions and have a particle size of less than about 360 nm as determined by the small angle X-ray scattering technique disclosed.

BACKGROUND

Toughened nylon compositions are commercial high volume products. Such compositions contain a continuous nylon phase and a dispersed toughener phase. Such compositions are disclosed in Epstein, U.S. Pat. No. 4,174,358 dated Nov. 13, 1979.

The present invention is an improvement over the compositions disclosed in the Epstein patent, in that it has been found that certain amorphous nylons, when toughened with certain specific tougheners, in certain specific amounts, and the toughener exists in the amorphous nylon as particles having a particle size of less than about 360 nm, yield fabricated parts having higher impact resistance at low temperature than those previously known.

SUMMARY OF THE INVENTION

The present invention is a thermoplastic composition consisting essentially of an amorphous polyamide matrix resin and copolymer particles dispersed in the polyamide matrix resin. The polyamide must be of high molecular weight and have an apparent melt viscosity of 3000 poise or more, when measured on a sample that contains no more than 0.15% by weight water, the measurement being made at 280° C. and at a shear rate of 100 sec$^{-1}$. The amorphous polyamide must be present in the composition in the amount of about 75% to 85% by weight of the composition. The copolymer particles that are dispersed substantially uniformly throughout the amorphous polyamide have a particle size such that when the small angle X-ray procedure described herein is applied to a sample of the polymer, a particle diameter less than about 360 nm is obtained. The implications of the procedure are that this represents a log-normal distribution where one-half the mass of the particles have a diameter less than about 360 nm. The copolymer particles have a Mooney viscosity of between about 40 and about 60. The composition of the copolymer particles is either (a) 66 to 70% by weight ethylene, 24 to 28% by weight propylene, 5.9 to 6.4% by weight hexadiene, and 0.1 to 0.16% by weight norbornadiene grafted with succinic anhydride groups in the amount of 0.25 to 2.25% by weight of the copolymer, or (b) mixtures of (a) and the ungrafted copolymers of (a) in which the mixture contains at least about 35% by weight of (a). The copolymer particles are present in the composition in the amount of at least 15% by weight of the composition. The copolymer particles in some of the compositions of the invention are present in amounts such that their weight plus the weight of the amorphous polyamide polymer combine to make 100% of the thermoplastic components of the compositions of the invention. The compositions of the invention may contain various fillers, reinforcing ingredients such as glass fibers, pigments, stabilizers, mold release agents, antistatic agents and the like all of which are known to those skilled in the art.

DETAILED DESCRIPTION

The thermoplastic amorphous polyamides are obtained from at least one aromatic dicarboxylic acid containing 8-18 carbon atoms and at least one diamine selected from the class consisting of (i) 1-12 carbon normal aliphatic straight-chained diamine, and (ii) 8-20 carbon cycloaliphatic diamines containing at least one cycloaliphatic ring.

Preferred diacids are isophthalic and terephthalic acids. Especially preferred are mixtures containing 60 to 70 mole % isophthalic acid and 40 to 30 mole % terephthalic acid.

Preferred diamines are hexamethylenediamine and bis(p-aminocyclohexyl) methane (PACM, hereinafter). PACM is available as a mixture of three stereoisomers—cis, cis; cis, trans; and trans, trans. Any isomer mixture can be used. Especially preferred are mixtures containing 20 to 35 mole % PACM isomers and 80 to 65 mole % hexamethylenediamine.

Amorphous polyamides prepared from the especially preferred mixtures of diacids and the especially preferred mixtures of diamines have glass transition temperatures above 140° C.

Amorphous polyamides will generally have no distinct melting point and a heat of fusion of less than 1 cal/gram. The heat of fusion is conveniently determined by use of a differential scanning calorimeter (DSC). A suitable calorimeter is The Du Pont Company's 990 thermal analyzer, Part No. 990000 with cell base II, Part No. 990315, and DSC cell, Part No. 900600. With this instrument, heat of fusion can be measured at a heating rate of 20° C. per minute. The sample is alternately heated to a temperature above the anticipated melting point and cooled rapidly by cooling the sample jacket with liquid nitrogen. The heat of fusion is determined on any heating cycle after the first and should be a constant value, within experimental error.

The apparent melt viscosity of the polyamides at 280° C. was determined by standard techniques with a capillary rheometer (typically with 0.0205 inch orifice diameter, 14.68/1 L/D ratio, and 0.3747 inch piston diameter).

The toughened products of this invention may be obtained from amorphous polyamides with an apparent melt viscosity of 3000 poise or more at 280° C. and a shear rate of 100 sec$^{-1}$ when the polyamides contain 0.15% or less water.

The toughened products of this invention may be obtained from amorphous polyamides with quite high melt viscosity, for example, a melt viscosity of 20,000 poise at 280° C., 100 sec$^{-1}$ shear rate, and 0.05% water. The upper limit of the polyamide melt viscosity is dictated by the ability of the final processing equipment to fabricate articles from high viscosity melts. Those skilled in the art will recognize that materials with comparatively high melt viscosity are desirable in extrusion and blow molding applications while products with lower melt viscosities might be desirable for the injection molding of complicated parts.

The copolymers that make up the dispersed particles in the composition of the present invention are either (a) copolymers containing 66 to 70% by weight ethylene, 24 to 28% by weight propylene, 5.9 to 6.4% by weight hexadiene, and 0.1 to 0.16% by weight norbornadiene having a Mooney viscosity of 40 to 60, and grafted with succinic anhydride groups so that the copolymer contains 0.25 to 2.25% by weight succinic anhydride groups, or (b) mixtures of (a) with ungrafted copolymers of (a), such mixtures containing at least about 35% by weight of (a). Processes for the preparation of such grafted copolymers are known in the art. A suitable process is disclosed in Caywood, U.S. Pat. No. 3,884,882.

The compositions of this invention may be prepared by mixing preweighed, blended quantities of the amorphous polyamides and the copolymers (tougheners) in the molten state under high shear. Such mixing can be accomplished in commercially available equipment such as a 53 mm twin-screw extruder manufactured by Werner & Pfleiderer Corporation. A satisfactory screw design for an 1860 mm long screw includes mixing elements 750 mm and 1390 mm from the feed end of the screw. Barrel heaters may be set at 260°–275° C. A vacuum port may be used near the die. Screw speeds of 200–250 rpm and extrusion rates of 120–230 pph afford the compositions of this invention with melt temperatures of 310° to 340° C. measured on the molten strand exiting the die. The strands are quenched in water and pelletized. The pellets are dried to a moisture content of 0.3% by weight or less prior to final processing (e.g., injection molding, blow molding, extrusion).

The copolymer particles in the compositions of this invention must have a particle size such that when the small angle X-ray procedure described herein is applied to a sample of the polymer, a particle diameter less than about 360 nm is obtained. The implications of the procedure are that this represents a log-normal distribution where one-half the mass of the particles have a diameter less than about 360 nm. The particle size distribution in the compositions of the invention is affected by the following factors: the viscosity of the polyamide, the viscosity of the copolymer, the amount of shear applied in mixing the polyamide and the copolymer, and the mixing temperature. Thus, by using a high viscosity polyamide, a low viscosity copolymer, a large amount of shear during mixing and a low mixing temperature, the desired particle size distribution can be readily achieved.

The concentrations for the ingredients in toughened amorphous polyamides are at least 15 weight % copolymer (toughener) and 85–75 weight % amorphous polyamide. Lower concentrations of the copolymer (toughener) afford products with inadequate low temperature toughness. Higher loadings of copolymer (toughener) give products with inadequate tensile strength and stiffness.

Especially preferred concentrations of the ingredients in the toughened products are 18–22 weight % copolymer (toughener) and 82–78 weight % amorphous polyamide.

The particle size is determined by small-angle X-ray scattering, according to the following technique: The small-angle X-ray scattering (SAXS) data should be acquired on a high-resolution instrument such as the one originally designed by Bonse and Hart Zeit. fur Physik, 189, 151 (1966), and subsequently manufactured commercially by Advanced Metals Research Corporation, Burlington, Mass., as the AMR Model 6-220 X-Ray Low Angle Scattering Goniometer. A suitable sample of amorphous polyamide containing dispersed copolymer particles consists of a molding (generally an injection-molded tensile or flex bar) of such thickness as to transmit about 1/e (1/2.71828 or 0.368) of a CuKα (wavelength=0.1542 nm) X-ray beam. This is the optimum thickness for transmission data (data acquired when the X-ray beam passes through the thickness of the sample along the surface normal), and is generally of the order of 80 mils (0.08 inches or about 2 mm) for a typical sample. A typical molding is usually too thick (⅛ inch or greater) but can be thinned by sawing or milling.

Scattered X-ray intensity data are acquired in the range from 8 to 600 seconds of arc (2-theta). The AMR instrument is calibrated in seconds; this corresponds to a range of 0.002° to 0.16° or $4 \times 10^{-5}$ to $3 \times 10^{-3}$ radians. Appropriate step sizes range upwards from 2 seconds of arc as the scattering angle increases; 20 points each at step-sizes of 2, 4, 8, and 16 seconds will cover the angular range in 81 points. These are "slit-smeared" results, and, after smoothing and subtraction of instrumental background, should be "desmeared" before interpretation. For this work, the data are desmeared by the method of Schmidt and Hight, Acta Cryst. 13,480 (1960); P. W. Schmidt, Acta Cryst., 19,938 (1965) to cover the range from 0.005° to 0.07° 2-theta. (The experimental angular range from 0.07° to 0.16° of the observed data is required only to desmear the retained results below 0.07°). The desmeared intensity results can be represented as I(h), where $$h = \frac{4\pi \sin \theta}{\lambda} = k \times 2\theta.$$

Here, $\theta = (2\theta)/2$ (and $\sin \theta = \theta$ in radians at these small angles) and $\lambda$ = the wavelength of CuKα radiation. These intensity results are converted to the "Invariant" argument, $h^2 I(h)$, by multiplying each desmeared intensity by the square of the angle of observation for that point.

A plot of the invariant argument will be characterized by having a maximum at an angle below 0.04° 2-theta if the dispersed particles causing the scattering have diameters of the order of hundreds of nanometers. If the particle-size distribution is narrow (nearly monodisperse), the particle diameter is inversely proportional to the position of this maximum: diameter = $4.87/2\theta°_{max}$ nm. If there is finite breadth to the distribution, the peak position will be shifted to lower angles and the breadth of the distribution must be taken into account. For the results cited here, the observed invariant-argument curves were matched to calculated curves derived assuming a model of a log-normal particle-size distribution. For typical distributions, the most probable particle size is of the order of ⅔ to ¾ that calculated on the basis of the peak position of the invariant argument alone.

In order to characterize a particle-size distribution in the manner employed here, two measurements are made on the invariant-argument curve. The angular position (2-theta), $h_m$, of the maximum is determined and the angular position of the "half-height" $h_\lambda$, is determined. The half-height is that point on the invariant-argument curve which has an ordinate one-half that of the maximum and is on the high-angle side of the maximum. Given a log-normal model, the breadth of the distribution, expressed in relative terms, is a function only of the ratio, $R_h$, of these two angles: $R_h = h_h/h_m$. ($R_h$ should have a value greater than about 1.57. If it is significantly less than this, the position of the maximum of the curve has probably been displaced to higher angles by interparticle interference arising from close, regular packing of the particles.)

A log-normal distribution can be characterized by $R_S$, the ratio of the size at one-sigma of the distribution to the size at the center. For this work, an expression for $R_S$ was determined from $R_h$ by a third order polynomial regression fit to computer-generated data. This equation is:
$R_S = 1.19056 + 1.84535R_h - 0.33524R_h^2 + 0.030186R_h^3$
(Note that when $R_h = 1.5728+$, $R_S = 1.00$ and the distribution is monodisperse. An $R_S$ of less than 1.0 has no physical meaning.)

For each distribution ratio, $R_S$, there is a factor, F, which can be used to correct the apparent size derived from the position of the invariant maximum corresponding to a monodisperse "distribution". Again, a third order polynomial fit was determined from a computer-generated model:
$F = 1.48725 - 0.42839R_S - 0.062415R_S^2 + 0.022482R_S^3$.

The scattering curve from monodisperse spherical particles can be approximated at very low angles by $I(h) = K \exp(-h^2R_o^2/3)$. (See A. Guinier & G. Fournet, *Small-Angle Scattering of X-Rays*, John Wiley & Sons, Inc., New York (1955) page 25), where $R_o$ is the radius of gyration. The invariant argument is then $kh^2 \exp(-h^2R_o^2/3)$. From the differentiation of this expression, the condition for the maximum, $h_m$, is: $h_m^2R_o^2/3 = 1$ or $R_o = \sqrt{3/h_m}$. Substituting for $h_m = 2\pi$. $2\theta_m/2$, $R = 3\sqrt{h_m/(2\pi 2\theta_m)}$ where $\lambda CuK\alpha 0.15418$ nm, $R_o = 0.042502/2\theta_{max}$ if $2\theta$ is in radians, $R_o = 2.4352/2\theta_{max}$ if $2\theta$ is in degrees. For the approximation used in this work, the exponential (Gaussian) fit does not extend to angles as high as represented by the maximum of the invariant argument, and a better approximation is given by: $R_o = 2.182/2\theta_{max}$ where $2\theta$ is in degrees. Since the diameter of a sphere, D, as a function of the radius of gyration, $R_o$, is: $D = 2\sqrt{5/3} R_o$, than $D_m(nm) = 5.6339/2\theta_{max}(deg) D_m$ is the diameter of a particle in a monodisperse "distribution", where all the particles are the same size. When there is a finite distribution of sizes modeled as described above, then the characteristic diameter, $D_c$, is derived from $D_m$ as: $D_c = F^*D_m$.

In the compounds of the present invention the characteristic diameter, $D_c$, is no greater than about 360 nm.

The composition of the invention may be fabricated into high impact parts such as automobile body parts, for example bumpers, fender extensions and the like by injection molding, blow molding, extrusion and other similar techniques.

The composition of the invention include blends of two or more different amorphous polyamides with the tougheners disclosed.

In the Examples which follow yield strength and elongation at break were determined according to ASTM D-638. Flexural modulus was determined (¼-inch specimens) according to ASTM D-790. Notched Izod impact (¼-inch specimens) was determined according to ASTM D-256. The type of specimen break is noted in the examples and conforms to definitions in ASTM D-256, namely:

C = complete break—wherein the specimen separates into two or more pieces

H = hinge break—an incomplete break such that one part of the specimen cannot support itself above the horizontal when the other part is held vertically P = partial break—an incomplete break that is not a hinge break but has fractured at least 90 percent of the distance between the vertex of the notch and the opposite side N = non-break—an incomplete break where the fracture extends less than 90 percent of the distance between the vertex of the notch and the opposite side M = mixed breaks—some of the samples have complete breaks and some of the samples have partial breaks Notched Izod impact values were plotted versus temperature. In one high temperature region the impact values were high (>500 J/m) and the specimens broke in a ductile manner (partial or non-break according to ASTM D-256). In a lower temperature region the samples broke in a brittle fashion to two or more pieces at much lower energy. The ductile/brittle transition temperature is defined as that temperature at which half the specimens break by ductile failure and half break completely. The ductile/brittle transition temperature occurs at the point of steepest slope on the plot of notched Izod impact value versus temperature.

"Dry-as-molded" (DAM in Table 3) specimens (<0.2% water) of the compositions of this invention have ductile/brittle transition temperatures of $-10°$ C. or below in the standard notched Izod impact test (ASTM D256).

The amorphous nylons containing tougheners were tested dry-as-molded. The amorphous nylons containing tougheners were conditioned in an accelerated procedure to a moisture content equivalent to 50% RH by first immersing them in demineralized water at 50° C. and then storing them in air at 23° C. and 50% relative humidity until the weight gain matched that attained by long term equilibrium exposure of such samples to air at 23° C. and 50% relative humidity.

EXAMPLES 1–10

Table 1 below lists the seven different amorphous polyamides that are used in the examples. The compositions in Table 1 are designated by numbers and letters and have the following meaning: "6" means hexamethylenediamine, "I" means isophthalic acid, "T" means terephthalic acid, "PACM" means bis-(para aminocyclohexyl) methane. Thus in Table 1, polyamide number 1 contains 66.6% by weight of polyamide units derived from hexamethylenediamine and isophthalic acid, 28.6% by weight of polyamide units derived from hexamethylenediamine and terephthalic acid, 3.4% by weight polyamide units of polyamide derived from bis(para-aminocyclohexyl) methane and isophthalic acid, and 1.4% by weight polyamide units derived from bis(para-aminocyclohexyl) methane and terephthalic acid, and polyamide number 3 contains 65 percent by weight of polyamide units derived from hexamethylenediamine and isophthalic acid, and 35 percent by weight of polyamide units derived from hexamethylene and terephthalic acid.

The copolymers (tougheners) that are dispersed in the compositions shown in the examples are either Toughener 1, i.e., a copolymer of ethylene 66–70% by weight, propylene 24–28% by weight, hexadiene 5.9–6.4% by weight, and norbornadiene 0.10–0.16% by weight, with a Mooney viscosity of 50–60 by ASTM D-1646 M 2+10 at 121° C. grafted with fumaric acid to contain 0.25 to 2.25% by weight succinic anhydride or Toughener 1 and 2, Toughener 2 being a copolymer of ethylene 66–70% by weight, propylene 24–28% by weight, hexadiene 5.9–6.4% by weight and norbornadiene 0.10–0.16% by weight, having a Mooney viscosity of 40–52.

All of the composition of Examples 1–10 were prepared under generally similar conditions within the scope outlined above. Table 2 sets forth the particular extrusion conditions for Examples 1, 4 and 6.

TABLE 1
POLYAMIDES

|  | Apparent Melt Viscosity, | Moisture |
| --- | --- | --- |

TABLE 2
EXTRUSION CONDITIONS

| Example Number | 1 | 4 | 6 |
| --- | --- | --- | --- |
| Screw Speed, rpm | 250 | 200 | 250 |
| Melt Temp., °C. | — | 336 | — |
| Extruder Vacuum, inches Hg | 11 | 26 | 17–18 |
| Melt Pressure at Die, psi | 225 | 990 | 345 |
| Extrusion Rate, pph | 205 | 127 | 220 |

TABLE 3

| Example Number | 1 | 2 | 3 | 4 | 5 | 6 | 7 | 8 | 9 | 10 |
| --- | --- | --- | --- | --- | --- | --- | --- | --- | --- | --- |
| Nylon Identity | 1 | 2 | 2 | 2 | 2 | 3 | 4 | 5 | 6 | 7 |
| Nylon Concentration, % | 84 | 84 | 81 | 75 | 75 | 84 | 84 | 75 | 81 | 80.3 |
| Toughener Identity | 1; 2 | 1 | 1 | 1 | 1; 2 | 1; 2 | 1; 2 | 1; 2 | 1; 2 | 1; 2 |
| Toughener Concentration, % | 8.4; 7.6 | 16 | 19 | 25 | 10; 15 | 8.4; 7.6 | 8.4; 7.6 | 10; 15 | 10; 9 | 10; 8.5 |
| Other Components Identity* | — | — | — | — | — | — | — | — | — | A; B |
| Other Components, % | — | — | — | — | — | — | — | — | — | 1; 0.3 |
| Rubber Particle Size, nm | 250 | 197 | 195 | 179 | 215 | 332 | 360 | 236 | 310 | 250 |
| Notched Izod, J/m, DAM |  |  |  |  |  |  |  |  |  |  |
| at +23° C. | 1060(P) | 1067(P) | 1026(P) | 1043(P) | 980(P) | 1008(P) | 1156(N) | 1071(N) | 704(P) | 640(P) |
| at +10° C. | — | — | — | — | — | — | — | — | 701(P) | — |
| at 0° C. | 932(P) | 952(P) | 965(P) | 963(P) | 947(P) | 884(P) | 968(P) | 991(P) | 678(P) | 557(P |
| at −10° C. | 808(P) | 728(M) | 894(P) | 941(P) | 933(P) | 713(P) | 692(M) | 976(P) | 615(P) | 443(M) |
| at −20° C. | 371(C) | 415(C) | 774(P) | 894(P) | 842(P) | 315(C) | 349(C) | 885(P) | 514(P) | 345(C) |
| at −30° C. | 311(C) | 331(C) | 419(C) | 833(P) | 685(P) | 269(C) | 295(C) | 763(P) | 295(C) | — |
| Ductile/Brittle Transition Temp., °C., DAM | −14 | −13 | −26 | −45 est | −35 est | −13 | −12 | −40 est | −25 | −12 |
| Notched Izod, J/m, at 50% RH |  |  |  |  |  |  |  |  |  |  |
| at +23° C. | 1130(N) | — | — | — | — | 1259(N) | 1405(N) | 1240(M) | 918(P) | — |
| at 0° C. | 1130(N) | — | — | — | — | 1080(P) | — | 1218(M) | 826(P) | — |
| at −10° C. | 949(P) | — | — | — | — | 867(P) | 937(P) | 1163(P) | 781(P) | — |
| at −20° C. | 395(M) | — | — | — | — | 243(C) | — | 929(P) | 498(M) | — |
| at −30° C. | 218(C) | — | — | — | — | — | — | 694(P) | — | — |
| Yield Strength, MPa |  |  |  |  |  |  |  |  |  |  |
| DAM | 65 | 69 | 63 | 52 | 54 | 62 | 60 | 55 | 61 | 67 |
| 50% RH | 54 | 56 | 50 | 40 | 44 | 52 | — | 44 | 53 | 63 |
| Elong. at Break, % |  |  |  |  |  |  |  |  |  |  |
| DAM | 168 | 31 | 30 | 44 | 93 | 157 | 139 | 135 | 61 | 44 |
| 50% RH | 191 | 131 | 140 | 142 | 143 | 207 | — | 157 | 128 | 36 |
| Flex. Modulus, MPa |  |  |  |  |  |  |  |  |  |  |
| DAM | 1900 | 1900 | 1700 | 1400 | 1500 | 1900 | 1800 | 1600 | 1800 | 1900 |
| 50% RH | 2000 | 2100 | 1900 | 1500 | 1700 | 2000 | 1900 | 1700 | — | — |

*A = Concentrate of 45% carbon black predispersed in 55% ethylene/methylacrylate copolymer. Manufactured by Ampacet Corp.
B = Heat stabilizer mixture composed of 82.4% (by weight) potassium iodide, 11.8% cuprous iodide, and 5.9% aluminum distearate.

| Number | Composition | Inherent Viscosity | poise, at 280° C. and 100 sec$^{-1}$ shear rate | Content of Melt Viscosity Sample, % |
| --- | --- | --- | --- | --- |
| 1 | *6I/6T/PACM-I/PACM-T-66.6/28.6/−3.4/1.4% by weight (same ratio for polyamide 2) | 0.87 | >4000 | 0.10 |
| 2 | *6I/6T/PACM-I/PACM-T | 0.92 | 7700 | 0.31 |
| 3 | *6I/6T-65/35 | 0.76 | 4000 | 0.16 |
| 4 | *6I/6T-65/35 with excess amine ends | 0.80 | >4000 | 0.10 |
| 5 | *6I/6T-65/35 | 0.96 | >4000 | 0.10 |
| 6 | *6I/6T/PACM-I/PACM-T-49.7/21.2/20.3/8.8% by weight | 0.72 | 14000 | 0.18 |
| 7 | *6I/6T/PACM-I/PACM-T-36.9/24.6/23.1/15.4% by weight | 0.68 | 15000 | 0.08 |

*These amorphous nylons also contain ca 0.1% by weight of the antioxidant sodium phenylphosphinate added with the monomers at the beginning of the autoclave polymerization cycle.

I claim:

1. A thermoplastic composition having high impact resistance at low temperatures, said composition consisting essentially of an amorphous polyamide matrix resin, said polyamide having an apparent melt viscosity of 3000 poise or more, as measured at 280° C. and a shear rate of 100 sec.$^{-1}$, said amorphous polyamide being present in the composition in the amount of about 75 to 85% by weight of the composition, and copolymer particles that are dispersed in said amorphous polyamide said copolymer particles having a particle size, as determined by small angle X-ray scattering, of less than about 360 nm, said copolymer particles being selected from the class consisting of (a) copolymer having a Mooney viscosity of 40 to 60, containing 66 to 70% by weight ethylene, 24 to 28% by weight propylene, 5.9 to 6.4% by weight hexadiene, and 0.1 to 0.16% by weight norbornadiene, grafted with succinic anhydride groups in the amount of 0.25 to 2.25% by weight of the copolymer and (b) mixtures of (a) with the ungrafted copolymers of (a), such mixtures containing at least about 35% by weight of (a), said copolymer particles being present in an amount of at least 15% by weight the composition.

2. The composition of claim 1 in which the amorphous polyamide is the reaction product of at least one aromatic dicarboxylic acid containing 8 to 18 carbon atoms and at least one diamine selected from the class consisting of 1-12 carbon normal aliphatic straight chain diamines, and 8 to 20 carbon cycloaliphatic diamines containing at least one cycloaliphatic ring.

3. The composition of claim 2 in which the polyamide is the reaction product of isophthalic acid, terephthalic acid, and hexamethylenediamine.

4. The composition of claim 2 in which the polyamide is the reaction product of isophthalic acid, terephthalic acid, hexamethylenediamine and bis(p-aminocyclohexyl)methane.

5. The composition of claim 4 in which the reaction product contains 20 to 35 mole % units obtained by the reaction of bis(p-aminocyclohexyl)methane, and 80 to 65 mole % hexamethylenediamine.

6. The composition of claim 1 in which the copolymer particles are from the (a).

7. A fabricated automobile body part from the composition of claim 1.

8. The fabricated automobile body part of claim 1 in which the part is a bumper.

* * * * *